United States Patent
Venkatasubramanian et al.

(10) Patent No.: US 10,509,718 B2
(45) Date of Patent: Dec. 17, 2019

(54) SYSTEM AND METHOD FOR AUTOMATICALLY GENERATING SOFTWARE TESTING SCRIPTS FROM TEST CASES

(71) Applicant: Cognizant Technology Solutions India Pvt. Ltd., Chennai (IN)

(72) Inventors: Ramakrishnan Venkatasubramanian, Chennai (IN); Amarnath Sankar, Chennai (IN); Carnelian Lamech, Chennai (IN); Ghatak Anit, Hooghly (IN); Srinivasan Kumarappan, Chennai (IN); Suraj Sangavkar, Kolhapur (IN)

(73) Assignee: COGNIZANT TECHNOLOGY SOLUTIONS INDIA PVT. LTD, Chennai (IN)

( * ) Notice: Subject to any disclaimer, the term of this patent is extended or adjusted under 35 U.S.C. 154(b) by 34 days.

(21) Appl. No.: 15/886,338

(22) Filed: Feb. 1, 2018

(65) Prior Publication Data
US 2019/0179732 A1    Jun. 13, 2019

(30) Foreign Application Priority Data
Dec. 8, 2017 (IN) .............................. 201741044117

(51) Int. Cl.
*G06F 9/44* (2018.01)
*G06F 11/36* (2006.01)
(Continued)

(52) U.S. Cl.
CPC ............ *G06F 11/3684* (2013.01); *G06F 8/10* (2013.01); *G06F 8/34* (2013.01); *G06F 11/3664* (2013.01);
(Continued)

(58) Field of Classification Search
CPC . G06F 11/3684; G06F 11/362; G06F 11/3668
(Continued)

(56) References Cited

U.S. PATENT DOCUMENTS

| 4,974,191 A | * | 11/1990 | Amirghodsi | .......... G06F 17/277 380/1 |
| 7,480,602 B2 | | 1/2009 | Duffie | |

(Continued)

OTHER PUBLICATIONS

Nivas et al, "Test Harness and Script Design Principles for Automated Testing of Non-GUI or Web Based Applications", ACM, pp. 30-37, 2011 (Year: 2011).*
(Continued)

*Primary Examiner* — Anil Khatri
(74) *Attorney, Agent, or Firm* — Cantor Colburn LLP (57) ABSTRACT

A system and computer-implemented method for generating software testing scripts from test cases is provided. The system comprises a test case importing module configured to receive test cases and a Natural Language Processing (NLP) module configured to scan and mine text of the received test cases. Furthermore, the system comprises a user interface object identifier to identify one or more User Interface (UI) elements, functional flow models and test steps and corresponding test data. The system also comprises a user interface object mapper to map the one or more identified UI elements from the test cases with one or more user interface elements corresponding to one or more wireframes. In addition, the system comprises a test script generator to receive the mapped one or more UI elements, the identified functional flow models and the identified test steps and corresponding test data for generating test scripts.

16 Claims, 3 Drawing Sheets

(51) Int. Cl.
*G06F 8/34* (2018.01)
*G06N 5/02* (2006.01)
*G06F 17/27* (2006.01)
*G06F 8/10* (2018.01)
*G06N 20/00* (2019.01)

(52) U.S. Cl.
CPC ............ *G06F 17/27* (2013.01); *G06N 5/022* (2013.01); *G06N 20/00* (2019.01)

(58) Field of Classification Search
USPC .................................. 717/124–127, 140–141
See application file for complete search history.

(56) References Cited

U.S. PATENT DOCUMENTS

| | | | | |
|---|---|---|---|---|
| 7,523,425 | B2* | 4/2009 | Bunin | G06F 17/504 716/107 |
| 7,890,946 | B2* | 2/2011 | Blumfield | G06F 8/65 717/171 |
| 8,239,831 | B2 | 8/2012 | Brennan | |
| 8,307,351 | B2* | 11/2012 | Weigert | G06F 21/16 717/131 |
| 8,347,276 | B2* | 1/2013 | Schadow | G06F 8/20 715/239 |
| 8,365,147 | B2* | 1/2013 | Grechanik | G06F 8/70 714/37 |
| 8,392,886 | B2* | 3/2013 | Sweis | G06F 11/3688 717/124 |
| 8,402,547 | B2* | 3/2013 | Wiegenstein | G06F 11/3604 717/127 |
| 8,527,953 | B2* | 9/2013 | Grechanik | G06Q 10/06 715/762 |
| 8,661,411 | B2* | 2/2014 | Agapi | G06F 11/3688 704/257 |
| 8,799,866 | B2* | 8/2014 | Bullard | G06F 3/048 717/125 |
| 8,826,084 | B1 | 9/2014 | Gauf | |
| 8,954,936 | B2* | 2/2015 | Bnayahu | G06F 8/10 717/128 |
| 8,972,938 | B2* | 3/2015 | Bnayahu | G06F 11/3676 455/404.2 |
| 9,189,369 | B1* | 11/2015 | Giardina | G06F 11/3688 |
| 9,489,277 | B2* | 11/2016 | Kit | G06F 11/263 |
| 2011/0123973 | A1 | 5/2011 | Singh | |
| 2012/0311541 | A1* | 12/2012 | Bullard | G06F 11/368 717/127 |
| 2014/0281721 | A1 | 9/2014 | Navalur | |

OTHER PUBLICATIONS

Daniel et al, "Automated GUI Refactoring and Test Script Repair (Position Paper)", ACM, pp. 38-41, 2011 (Year: 2011).*
Sneed et al, "Testing against natural language Requirements", IEEE, pp. 1-8 (Year: 2007).*
Cohen et al, "Software testing and the naturally occurring data assumption in natural language processing", ACM, pp. 23-30 (Year: 2008).*
Fazzini et al, "Automatically Translating Bug Reports into Test Cases for Mobile Apps", ACM, pp. 141-152 (Year: 2018).*
Carvalho et al, "Test Case Generation from Natural Language Requirements based on SCR Specifications", ACM, pp. 1217-1227 (Year: 2013).*
Ansari et al, " Constructing Test Cases Using Natural Language Processing", IEEE, pp. 1-5 (Year: 2017).*
Scriptless Test Automation, Geometric Limited, Feb. 1, 2011.

* cited by examiner

SYSTEM AND METHOD FOR AUTOMATICALLY GENERATING SOFTWARE TESTING SCRIPTS FROM TEST CASES

FIELD OF THE INVENTION

The present invention relates generally to automated software testing. More particularly, the present invention provides a system and method for automatically generating software testing scripts from one or more test cases.

BACKGROUND OF THE INVENTION

Software testing is a manual process that requires considerable effort for development of testing scripts. With the advancement in the Information Technology (IT) industry, ubiquitous use of software applications and ever-changing requirements and new releases of software applications, it is critically important to reduce time required for software testing to reduce overall time for developing software. In order to achieve this, it is important to efficiently generate testing scripts.

Conventionally, various systems and methods exist for generating test scripts for software testing. For example, testing scripts are generated by testers manually. However, manually generating the test scripts is prone to errors, time consuming and arduous. Further, changes during development leads to additional testing efforts and time. Moreover, test scripts are manually generated in later stages of Software Testing Lifecycle (STLC) thereby causing further delays.

In light of the above-mentioned disadvantages, there is a need for a system and method for automatically generating software testing scripts from one or more test cases. Further, there is a need for a system and method that reduces overall manual effort required for testing and deploys automation from early stages of the STLC. Furthermore, there is a need for a system and method that integrates with existing reporting tools. In addition, there is a need for a system and method that is capable of re-using and maintaining the generated testing scripts. Also, there is a need for a system and method that integrates with software testing tools to automatically source one or more test cases for generation of the test scripts. Further, there is a need for a system and method that ensures complete coverage of testing requirements.

SUMMARY OF THE INVENTION

In an embodiment of the present invention a system for generating software testing scripts from test cases is provided. The system comprises a test case importing module configured to receive one or more test cases. The system further comprises a Natural Language Processing (NLP) module configured to scan and mine text of the one or more received test cases. Furthermore, the system comprises a user interface object identifier configured to identify one or more User Interface (UI) elements, one or more functional flow models and one or more test steps and corresponding test data based on the mined text of the one or more test cases. The system also comprises a user interface object mapper configured to map the one or more identified UI elements from the one or more test cases with one or more user interface elements corresponding to one or more wireframes. The one or more wireframes are received and scanned by the NLP module and the one or more user interface elements in the one or more scanned wireframes are identified by the user interface object identifier. In addition, the system comprises a test script generator configured to receive the mapped one or more UI elements, the one or more identified functional flow models and the identified one or more test steps and corresponding test data for generating one or more test scripts corresponding to the one or more received test cases.

In an embodiment of the present invention, the one or more test cases are received from one or more sources comprising one or more test management systems, one or more test design tools and one or more test case repositories. In an embodiment of the present invention, the one or more test cases are received by importing one or more files and further wherein the one or more files have one or more formats comprising spreadsheet format, document format, Extensible Markup Language (XML) format and image format. In an embodiment of the present invention, scanning and mining the text of the one or more received test cases comprises understanding words, sentences and their relationships with respect to context, tagging the mined text of the one or more received test cases, identifying relationships and deciphering functional flow between the tagged content, identifying context of the one or more mined test cases and using machine learning features. In an embodiment of the present invention, the one or more functional flow models provide logical relationship between the one or more test cases and the one or more test steps.

In an embodiment of the present invention, the test script generator is configured to structure and forward the mapped one or more UI elements, the one or more identified functional flow models and the identified one or more test steps and corresponding test data to one or more external test automation tools. In an embodiment of the present invention, the one or more wireframes pertain to one or more software applications under development. In an embodiment of the present invention, the system further comprises an artificial intelligence module configured to perform functions comprising analytical reasoning, updating knowledge bank, planning, learning through actions, initiating natural language processing, perception and manipulation.

In anther embodiment of the present invention a computer-implemented method for generating software testing scripts from test cases is provided. The computer implemented method comprises receiving one or more test cases. The computer-implemented method further comprises scanning and mining text of the one or more received test cases. Furthermore, the computer-implemented method comprises identifying one or more User Interface (UI) elements, one or more functional flow models and one or more test steps and corresponding test data based on the mined text of the one or more test cases. The computer-implemented method also comprises mapping the one or more identified UI elements from the one or more test cases with one or more UI elements corresponding to one or more wireframes. The one or more wireframes are received and scanned and the one or more user interface elements in the one or more scanned wireframes are then identified. In addition, the computer-implemented method comprises receiving, at a test script generator, the mapped one or more UI elements, identified one or more functional flow models and the identified one or more test steps and corresponding test data for generating one or more test scripts corresponding to the one or more received test cases.

In yet another embodiment of the present invention a computer program product for generating software testing scripts from test cases is provided. The computer program product comprises a non-transitory computer-readable medium having computer-readable program code stored thereon. The computer-readable program code comprising instructions that when executed by a processor, cause the processor to receive one or more test cases. The processor further scans and mines text of the one or more received test cases. Furthermore, the processor identifies one or more User Interface (UI) elements, one or more functional flow models and one or more test steps and corresponding test data based on the mined text of the one or more test cases. The processor also maps the one or more identified UI elements from the one or more test cases with one or more UI elements corresponding to one or more wireframes, wherein the one or more wireframes are received and scanned and the one or more user interface elements in the one or more scanned wireframes are then identified. In addition, the processor receive, at a test script generator, the mapped one or more UI elements, identified one or more functional flow models and the identified one or more test steps and corresponding test data for generating one or more test scripts corresponding to the one or more received test cases.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for automatically generating software testing scripts from one or more test cases is described herein. The invention provides for a system and method that reduces overall manual effort required for testing and deploys automation from early stages of the STLC. The invention further provides for a system and method that integrates with existing reporting tools. Furthermore, the invention provides for a system and method that is capable of re-using and maintaining the generated testing scripts. Also, the invention provides for a system and method that integrates with software testing tools to automatically source one or more test cases for generation of the test scripts. In addition, the invention provides for a system and method that ensures complete coverage of testing requirements.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
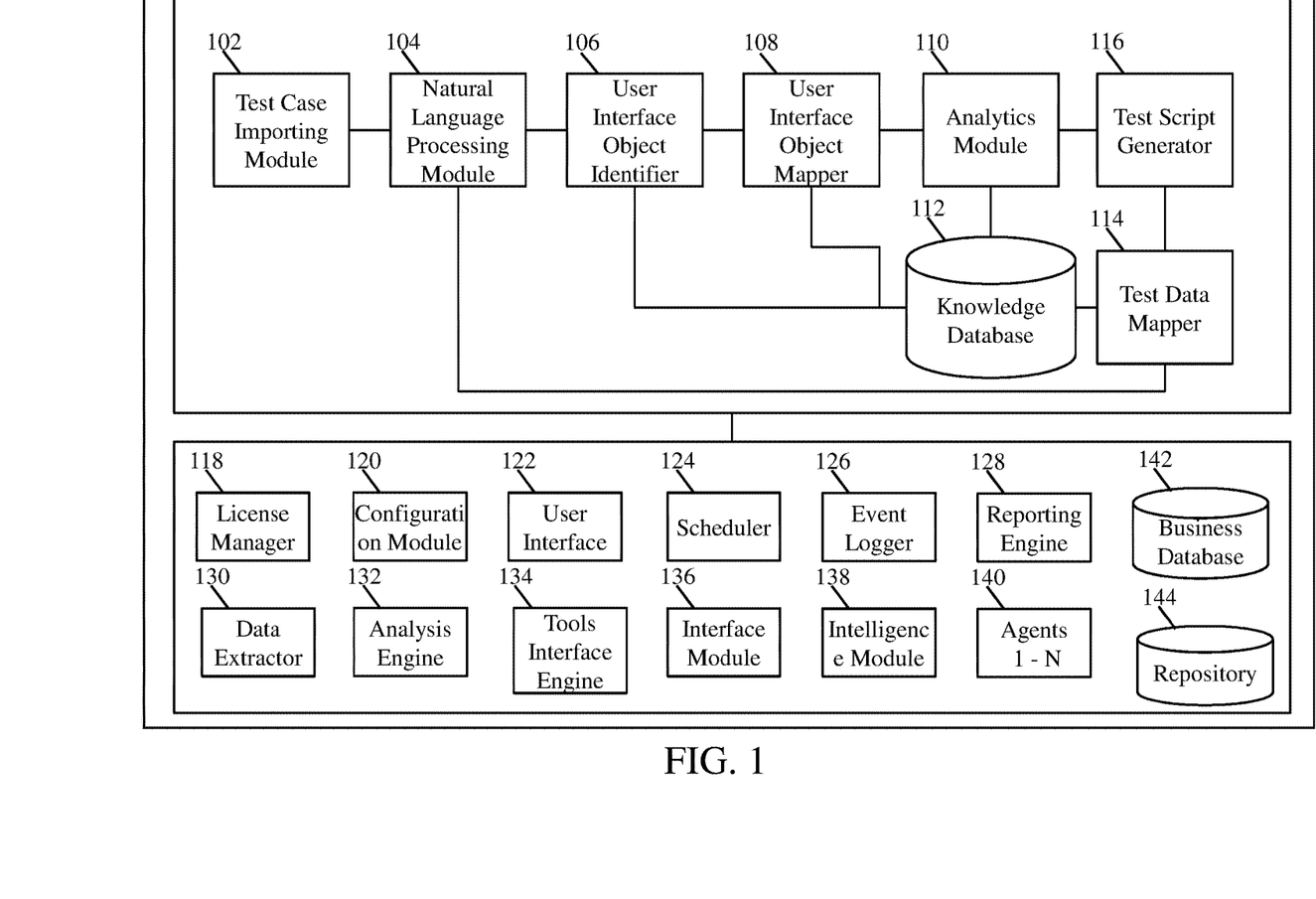
FIG. 1 is a block diagram illustrating a system for automatically generating software testing scripts from one or more test cases, in accordance with an embodiment of the present invention.

FIG. 1 is a block diagram illustrating a system 100 for automatically generating software testing scripts from one or more test cases, in accordance with an embodiment of the present invention.

The system 100 comprises a test case importing module 102, a natural language processing module 104, a user interface object identifier 106, a user interface object mapper 108, an analytics module 110, a knowledge database 112, a test data mapper 114, a test script generator 116, a license manager 118, a configuration module 120, a user interface 122, a scheduler 124, an event logger 126, a reporting engine 128, a data extractor 130, an analysis engine 132, a tools interface engine 134, an interface module 136, an intelligence module 138, one or more agents 140, a business database 142 and a repository 144.

The test case importing module 102 is configured to receive one or more test cases. In an embodiment of the present invention, the one or more test cases are received from different sources such as, but not limited to, test management systems, test design tools and test case repositories containing manually prepared test cases. The one or more test design tools include, but not limited to, Cognizant's Adpart, Dynamic Object-Oriented Requirements System (DOORS) and enterprise architect software. The one or more test design tools facilitate capturing the functional test flows of the one or more test cases as one or more flow diagrams. In an embodiment of the present invention, the one or more test cases are received by importing one or more files. The one or more files have various formats such as, but not limited to, spreadsheet format, document format, EXtensible Markup Language (XML) format and image format. In an embodiment of the present invention, the one or more test cases are in the form of XML diagrams. In another embodiment of the present invention, the one or more test cases are written in a human-understandable language in a Microsoft Word document.

The one or more files comprising the one or more test cases are forwarded to the Natural Language Processing (NLP) module 104. The NLP module 104 is configured to scan the one or more received test cases and mine text of the one or more received test cases. In an embodiment of the present invention, scanning and mining the one or more files comprising the one or more test cases include understanding the words, sentences and their relationships with respect to the context. The NLP module 104 is also configured to tag the mined text of the one or more received test cases, identify relationships and decipher functional flow between the tagged content, identify context of the one or more mined test cases and provide additional machine learning features.

Once the one or more test cases are mined, the User Interface (UI) object identifier 106 identifies one or more UI elements/objects, one or more functional flow models corresponding to the one or more test cases and the one or more identified test steps and corresponding test data based on the mined text of the one or more test cases. The one or more identified functional flow models corresponding to the one or more test cases provide logical relationship between test cases and test steps. The UI object identifier 106 then stores the one or more identified UI elements/objects, the one or more identified functional flow models and the one or more identified test steps and corresponding test data in a machine readable form in the knowledge database 112 for mapping. Further, the one or more identified UI elements/objects are stored with a temporary index.

Once the one or more identified UI objects are stored, the control is transferred to the user interface object mapper 108. The user interface object mapper 108 is configured to perform mapping of the one or more UI objects from the one or more test cases with one or more UI objects/elements corresponding to one or more wireframes of an application under development.

In an embodiment of the present invention, the NLP module 104 is configured to receive the one or more wireframes of the application under development. The NLP module 104 profiles and scans the one or more received wireframes. After scanning of the one or more wireframes, the UI object identifier 106 identifies the one or more UI objects/elements present in the one or more received wireframes. The UI object mapper 108 fetches the temporary index/list of the one or more stored UI objects corresponding to the one or more test cases. The UI object mapper 108 then maps the one or more identified UI objects/elements corresponding to the one or more wireframes with the one or more identified UI objects from the one or more test cases. After mapping, the fetched temporary index/list of the one or more stored UI objects corresponding to the one or more test cases is updated with their real names from the one or more received wireframes based on the mapping.

In an embodiment of the present invention, the system 100 also comprises a test case validator. The test case validator communicates with the UI object mapper 108 to validate the received one or more test cases based on the mapping.

In an embodiment of the present invention, the system 100 provides one or more options to the one or more testers/developers to map the one or more UI elements in the one or more received wireframes to one or more unmapped UI objects from the one or more received test cases. In an embodiment of the present invention, the system 100 facilitates in identifying any missing UI objects in the one or more test cases and the one or more wireframes based on the mapping. The system 100 is also capable of alerting developers, testers and any other stakeholders in case any UI objects elements are missing in the one or more wireframes but are present in the one or more test cases or vice versa.

The analytics module 110 and the knowledge database 112 facilitate various analytical and storing operations in conjunction with other components of the system 100. In an embodiment of the present invention, the analytical operations include, but not limited to, analysing and storing list of the UI objects from the test cases and wireframes, analysing and storing list of the one or more wireframes and updating and tagging the mapped one or more UI objects to specific rules.

The analytical module 110 and the knowledge database 112 also facilitate storing additional components such as, but not limited to, logos and images embedded within the one or more wireframes that are not required during functional testing.

The test data mapper 114 is configured to map test data with the one or more received test cases. The test data mapper 114 communicates with the NLP module 104 to intelligently map test data with test steps of the one or more test cases that were converted into machine readable test cases and stored in the knowledge database 112.

The test script generator 116 is configured to receive and structure the mapped one or more UI elements, identified functional flow and identified test steps and corresponding mapped test data to facilitate generating one or more test scripts. In an embodiment of the present invention, the test script generator 116 structures and then forwards the structured data to one or more external test automation tools such as, but not limited to, QUICK TEST PROFESSIONAL (QTP), SELENIUM, ROBOTIUM and APPIUM. The one or more external automation tools then generate the one or more test scripts corresponding to the one or more received test cases.

The test script generator 116 comprise plugins that facilitate in providing input to the one or more external test automation tools. The test script generator 116 generates structured templates that are pluggable to the one or more external test tools.

The system 100 comprise various other components that function in conjunction with the test case importing module 102, the natural language processing module 104, the UI object identifier 106, the UI object mapper 108, the analytics module 110, the knowledge database 112, the test data mapper 114 and the test script generator 116.

The license manager 118 is configured to validate license key of components of the system 100 and/or external components connected to the system 100 at the time of the initial run. In an embodiment of the present invention, the license manager 118 automatically allocates a license key if none exists for a component. Further, each component has separate licensing requirements and definitions that are stored in the license manager 118. Furthermore, new licenses are assigned based on the definition provided in the license manger 118. In an embodiment of the present invention, a demo license is assigned automatically that remains valid and working for a specific duration till there is a valid internet connection. In an embodiment of the present invention, the demo license is issued if the system 100 has at least one unallocated license of the requisite type. In an embodiment of the present invention, the license manager 118 provides one or more options to the one or more users to manage the licenses via the user interface 122. The one or more options for managing the licenses include, but not limited to, options to remove existing allocated licenses and assigning new licenses.

The configuration module 120 is configured to facilitate the one or more users to access the system 100 by registering and providing the requisite registration details via the user interface 122. The configuration module 120 is also configured to facilitate license management by providing one or more options via the user interface 122 to receive the user details and allowing the one or more users of the system 100 for selecting licenses from a list of available licenses.

The configuration module 120 functions in conjunction with the license manger 118 for facilitating the one or more users to select licences and configure the components of the system 100 based on the licenses subscribed by the one or more users. In an embodiment of the present invention, the configuration module 120 provides options for manual and automatic configurations.

The user interface 122 facilitates the one or more users to interact with the system 100. The scheduler 124 operates in real-time and facilitates coordination and synchronization of various components of system 100. The scheduler 124 defines and schedules implementation of the various functions of the system 100 in a synchronized, coordinated and efficient manner.

The event logger 126 logs all the events occurring at the system 100. In an embodiment of the present invention, the system 100 is implemented in a master and agent configuration. The system 100 can be accessed by the one or more users by installing application/agents on user devices such as, but not limited to, laptops, desktops and any other electronic communication devices. The event logger 126 logs events occurring at a user device once the agent installed on the user device is activated. The log is synced with the master server for monitoring the health and status of the application. The event logger 126 is also configured to facilitate tracing any issues with the system 100 and debugging and fixing the encountered issues.

The reporting engine 128 is configured to generate various types of reports queried by the one or more users via the user interface 122. The reporting engine 128 provides options to the one or more users for filtering generated reports and viewing requisite content. The reporting engine 128 also communicates with the analysis engine 132, the business database 142 and the knowledge database 112 to generate one or more reports queried by the one or more users. Further, the reporting engine 128 generates the one or more reports based on access rights provided to a user and denies permission to generate and view reports if the user is unauthorized. Further, the reporting engine 128 communicates with the tools interface engine 134 to forward the one or more generated reports to one or more external tools.

In an embodiment of the present invention, the reporting engine 128 is configured to include, but not limited to, screenshots of one or more screens of the application under test, validations and test execution results in the one or more generated reports. In an embodiment of the present invention, the reporting engine 128 also provides various filters to view and generate reports that correspond to modifications in the application. Further, the filters are based on, but not limited to, user interface, test execution and validation result.

The data extractor 130 is configured to facilitate extraction of relevant data from the one or more received test cases. In an embodiment of the present invention, the data extractor 130 identifies specific rows and columns to be used, collates the one or more received test cases and scenarios and provides necessary details to form structured information in the knowledge database 112.

The analysis engine 132 communicates with the analytics module 110, the data extractor 130, the knowledge database 112 and the reporting engine 128 to facilitate analysis of the one or more identified UI objects and data present in the one or more generated reports. The analysis engine 132 performs complex processing and analysis. The analysis engine 132 also communicates with the intelligence module 138 to format data for use by external tools. The data is formatted to a pre-defined template form for forwarding to the external tools. In an embodiment of the present invention, analysis engine 132 processes the request for interaction with the external tools to ensure only critical requests are forwarded.

The tools interface engine 134 is used to provide one or more Application Peripheral Interfaces (APIs) to integrate with the external tools required by the system 100. In an embodiment of the present invention, the APIs used Representational State Transfer (REST) based web services. In an embodiment of the present invention, the external tools include, but not limited to, Commercial Off-The-Shelf (COTS) solutions and open source applications such as QUICKTEST PROFESSIONAL testing tool, JIRA software, SELENIUM, ROBOTIUM, APPIUM, ADPART, DOORS, development tools and software configuration management tools. In an embodiment of the present invention, the tools interface engine 134 interacts with the one or more agents 140 corresponding to the one or more external tools and applications to push and pull information to and from the application whose services are used by the system 100. In an embodiment of the present invention, the tools interface engine 134 also provides an interface to use the system 100 from the one or more external tools and applications.

The interface module 136 faciliates in efficient communication with the system 100. The interface module 136 comprise a fault identifier module, actuators and a logger.

The fault identifier module is configured to function in the background with pre-defined rules and settings and identify one or more deviations. In an embodiment of the present invention, the one or more deviations include, but not limited to, hardware or software deviations that are captured by the fault finder module. The captured deviations are forwarded to the logger for further forwarding to the analysis engine 132 and the knowledge database 112.

The actuators are configured to understand the recommendations defined by the intelligence module 138 and interact and control hardware components and software components of the system 100.

The loggers are configured to log all the activities of the system 100 including any fault, action or recommendation. Further, logging activities of the system 100 facilitates in tracing complete system activity. In an embodiment of the present invention, the loggers work in conjunction with the event logger 126.

The intelligence module 138 is configured to intelligently perform complex processing and various functions of the system 100. The intelligence module 138 communicates with the NLP module 104 for scanning and mining the one or more received test cases. In an embodiment of the present invention, the NLP module 104 is a part of the intelligence module 138. In an exemplary embodiment of the present invention, the intelligence module 138 facilitates the NLP module to perform Optical Character Recognition (OCR) on one or more images containing the one or more test cases.

The intelligence module 138 also comprise a requirement processor, an Artificial Intelligence (AI) module, a risk engine, a module manager and a rules engine.

The requirement processor is configured to process requirements from one or more sources such as, but not limited to, requirement documents and virtual information from the AI module. The requirement processor synchronizes with the NLP module 104 to convert unstructured content from the one or more received test cases to structured content. The requirement processor is capable of identifying hidden requirements and writing back the identified hidden requirements into policies, rules or as a document.

The AI module works with other components of the system 100 to perform various functions such as, but not limited to, analytical reasoning, updating knowledge bank, planning, learning through actions, initiating NLP, perception and manipulation. The AI module uses statistical methods, computational intelligence and existing AI techniques to perform its functions.

The risk engine is configured to identify and collate all risks for a specific application or the services for which the system 100 is working. In an embodiment of the present invention, the risks depend on, but not limited to, type of activity, business functionality, environmental conditions and user's behavior. The identified risks are processed by the AI module on a specific context and actuated for certain actions. In an embodiment of the present invention, the risks are identified from historical information and domain/technology learning.

The module manager is configured to manage all the components of the system 100. The module manager provides information to the scheduler 124 for synchronization. The rules engine is configured to initiate self-learning, record actions, create new policies and rules during execution and usage.

The one or more agents 140 facilitate interaction amongst various components of the system 100. The one or more agents 140 are central controlling parts of the system 100. Further, each module of the system 100 has a corresponding agent that coordinates its operations. In an exemplary embodiment of the present invention, the one or more agents 140 comprise ObjPMAgent, ObjSCMAgent, ObjTesterAgent, ObjProjectAgent and ObjAutonomicAgent.

In an embodiment of the present invention, ObjPMAgent is part of the Project Development Life Cycle (PDLC) sub-system of the system 100. The ObjPMAgent interacts with the other agents such as, but not limited to, ObjProjectAgent, ObjSCMAgent and ObjTesterAgent. The ObjPMAgent also interacts with various components of the system 100 such as, but not limited to, the repository 144, the reporting engine 128, the tools interface engine 134 and the event logger 126 for performing various functions of the sub-system.

The ObjSCMAgent is part of the Software Development Lifecycle (SDLC) sub-system of the system 100. The ObjSCMAgent interacts with other agents such as, but not limited to, ObjProjectAgent, ObjPMAgent and ObjTesterAgent. The ObjSCMAgent also interacts with other modules of the system 100 such as, but not limited to, the repository 144, the tools interface engine 134 and the event logger 126 for performing various functions of the sub-system.

The ObjTesterAgent is part of the Software Testing Lifecycle (STLC) sub-system of the system 100. The ObjTesterAgent interacts with the agents such as, but not limited to, ObjProjectAgent, ObjPMAgent and ObjSCMAgent. The ObjTesterAgent also interacts with internal modules of the system 100 such as, but not limited to, the repository 144, the tools interface engine 134, the test data mapper 114 and the event logger 126 for performing various functions of the sub-system.

The ObjProjectAgent is part of the project sub-system of the system 100 and present as a central virtual machine on a local project server. The ObjProjectAgent interacts with agents such as, but not limited to, ObjTesterAgent, ObjPMAgent, ObjSCMAgent and ObjAutonomicAgent. The ObjProjectAgent interacts with internal modules such as, but not limited to, the repository database 144, the tools interface engine 134, the test data mapper 114, the event logger 126, the reporting engine 128 and the analysis engine 132 for performing various functions of the sub-system.

The ObjAutonomicAgent is a core part of the system 100 and present as a centralized virtual machine on a cloud. The ObjAutonomicAgent interacts with agents such as, but not limited to, ObjProjectAgent. Further, the objAutonomicAgent also interacts with internal modules of the system 100 such as, but not limited to, the intelligence module, the Business Database 142, the analysis engine 132 and event logger 126 for performing various functions of the system 100 and introducing domain/vertical specific best practices and capabilities provided by the analysis engine 132 and the intelligence module 138.

The business database 142 stores business information related to, but not limited to, domain, technology and historical project learning of the enterprise/organization using the system 100. The business database comprise business information in the form of, but not limited to, rules, policies and information that is provided to the AI module.

The repository 144 is configured to store the one or more UI objects extracted from the Software Configuration Management (SCM) environment. The repository 144 further stores the identified UI objects from the processed test cases. The repository 144 also temporarily stores results of the executed test scripts and synchronizes the same with the knowledge database 112.

In an embodiment of the present invention, the system 100 is capable of version controlling. The system 100 performs automatic versioning by assigning a version number to each input test case document and corresponding output test script execution report. Further, the system 100 compares the input test case document with previous versions of the same document and highlights modifications. Furthermore, the system 100 automatically provides a new version number in case of modifications to any input test case document. Also, test execution reports are versioned based on test case version, application version and time stamp of testing thereby facilitating ease of tracking changes and errors in previous versions.

In an embodiment of the present invention, the system 100 is a Java based agent which is part of a test management tool. In another embodiment of the present invention, the system 100 is hosted in a cloud environment and is accessible via one or more electronic devices of the one or more users.

The system 100 intelligently validates user interface changes using the received test cases, automatically creates testing scripts or modifies existing testing scripts and optimizes test flow by integrating with the external test automation tools to efficiently perform software testing and reduce time to market of new applications. The system 100 further facilitates testers to understand changes in the user interface of the applications while the build is happening in the agile environment. The system 100 is also capable of understanding test cases/test requirements written in English language and translating the same to functional actions. In an embodiment of the present invention, the one or more users may provide test cases to the system 100 via the test case importing module 102 in the form of one or more audio files for generating testing scripts. In an exemplary embodiment of the present invention, the test cases are dictated to the system 100 by the one or more users. In an embodiment of the present invention, the system 100 aids the one or more testers by mapping test data with the generated test scripts, learning mapping patterns and suggesting possible data set for future changes. In an embodiment of the present invention, the system 100 is capable of tracking changes that are committed by the developers in development environment or during the DevOps and generating new set of testing scripts using external tool adapters. Further, testing engineers are provided a report that comprises information related to the changes including, number of changes in a specific iteration, release cycle and project lifecycle.

Figure 2:
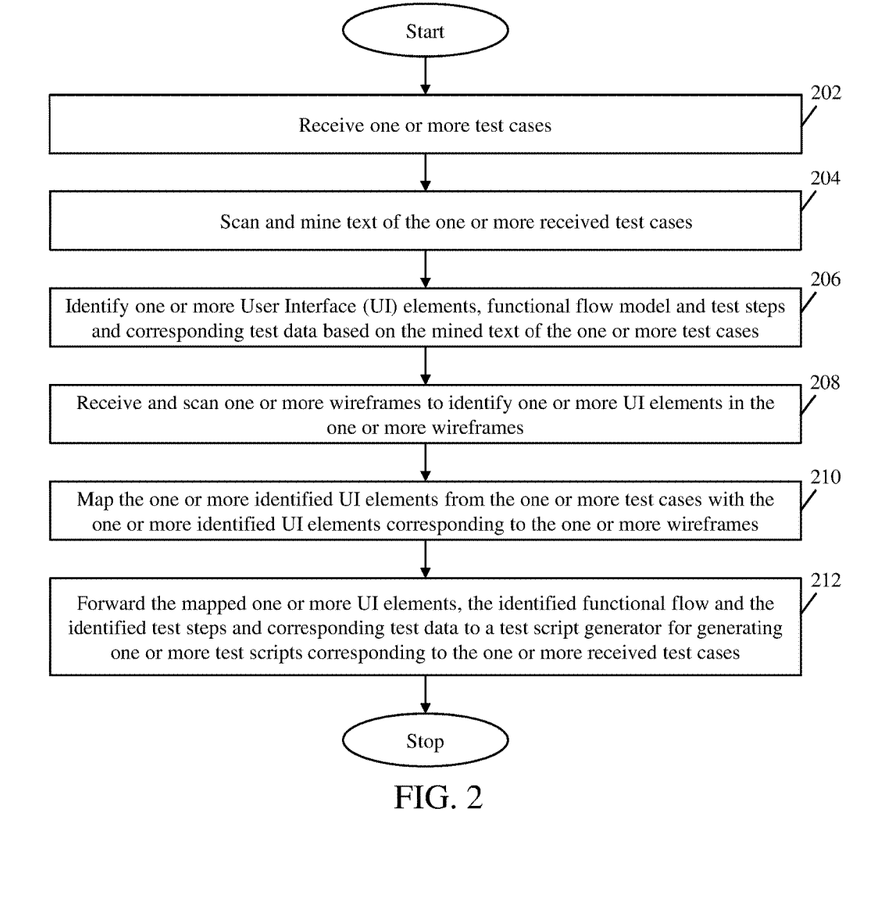
FIG. 2 is a flowchart illustrating a method for automatically generating software testing scripts from one or more test cases, in accordance with an embodiment of the present invention.

FIG. 2 is a flowchart illustrating a method for automatically generating software testing scripts from one or more test cases, in accordance with an embodiment of the present invention.

At step 202, one or more test cases are received. The one or more test cases are received from different sources such as, but not limited to, test management systems, test design tools and test case repositories containing manually prepared test cases. The one or more test design tools include, but not limited to, Cognizant's Adpart, Dynamic Object-Oriented Requirements System (DOORS) and enterprise architect software. The one or more test design tools facilitate capturing the functional test flows of the one or more test cases as one or more flow diagrams. In an embodiment of the present invention, the one or more test cases are received by importing one or more files. The one or more files have various formats such as, but not limited to, spreadsheet format, document format, EXtensible Markup Language (XML) format and image format. In an embodiment of the present invention, the one or more test cases are in the form of XML diagrams. In another embodiment of the present invention, the one or more test cases are written in a human-understandable language in a Microsoft Word document.

At step 204, the one or more received test cases are scanned and text of the one or more received test cases is mined. In an embodiment of the present invention, scanning and mining the one or more files comprising the one or more test cases include, but not limited to, understanding the words, sentences and their relationships with respect to the context. Further, the mined text of the one or more received test cases is tagged, relationships are identified and functional flow between the tagged content is deciphered, context of the one or more mined test cases is identified and additional machine learning features are used during scanning and mining.

At step 206, one or more User Interface (UI) elements/objects, one or more functional flow models and one or more test steps and corresponding test data are identified based on the mined text of the one or more test cases. The one or more functional flow models corresponding to the one or more test cases provide logical relationship between test cases and test steps. The one or more identified UI elements/objects, the one or more identified functional flow models and the one or more identified test steps and corresponding test data are stored in a machine readable form in a knowledge database for mapping. In an embodiment of the present invention, the one or more identified UI elements/objects are stored with a temporary index.

At step 208, one or more wireframes are received and scanned to identify one or more UI elements in the one or more wireframes of the application under development. In an embodiment of the present invention, the one or more received wireframes are profiled and scanned. After scanning of the one or more wireframes, the one or more UI objects/elements present in the one or more scanned wireframes are identified. Further, the temporary index/list of the one or more stored UI objects corresponding to the one or more test cases is then fetched from the knowledge database.

At step 210, the one or more identified UI elements from the one or more test cases are mapped with one or more user interface elements corresponding to one or more wireframes. After mapping, the fetched temporary index/list of the one or more UI objects corresponding to the one or more test cases is updated with their real names from the one or more received wireframes based on the mapping.

At step 212, the mapped one or more UI elements, the one or more identified functional flow models and the identified one or more test steps and corresponding test data is forwarded to a test script generator for generating one or more test scripts corresponding to the one or more received test cases.

In an embodiment of the present invention, during mapping, the identified test data is intelligently mapped with the one or more identified test steps of the one or more test cases that were converted into machine readable test cases and stored in the knowledge database. In an embodiment of the present invention, the test script generator is configured to receive and structure the mapped one or more UI elements, the one or more identified functional flow models and the identified one or more test steps and corresponding test data to facilitate generating the one or more test scripts. In an embodiment of the present invention, after structuring the test script generator forwards the structured data to one or more external test automation tools such as, but not limited to, QUICK TEST PROFESSIONAL (QTP), SELENIUM, ROBOTIUM and APPIUM. The one or more external automation tools then generate the one or more test scripts corresponding to the one or more received test cases. The test script generator comprise plugins that facilitate in providing input to the one or more external test automation tools. The test script generator generates structured templates that are pluggable to the one or more external test tools.

Figure 3:
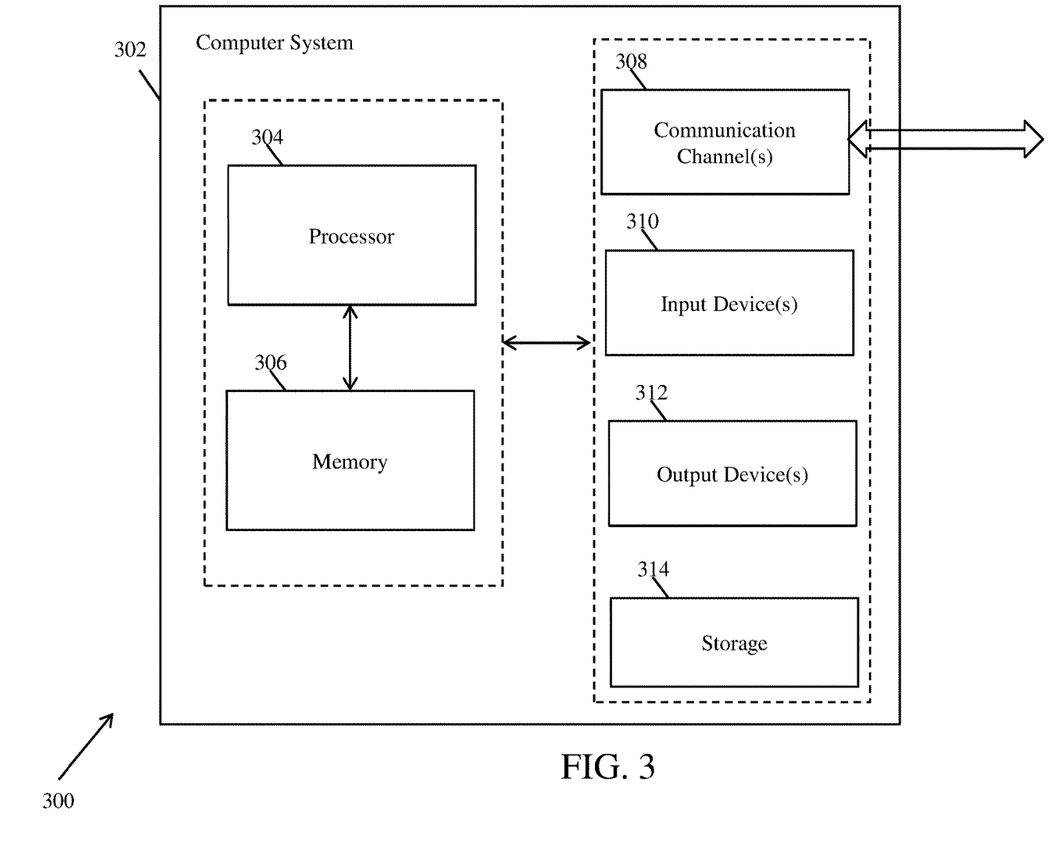
FIG. 3 illustrates an exemplary computer system for automatically generating software testing scripts from one or more test cases, in accordance with an embodiment of the present invention.

FIG. 3 illustrates an exemplary computer system for automatically generating software testing scripts from one or more test cases, in accordance with an embodiment of the present invention.

The computer system 302 comprises a processor 304 and a memory 306. The processor 304 executes program instructions and may be a real processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer system for generating software testing scripts from test cases associated with one or more applications, wherein the computer system comprises a microprocessor communicatively coupled to a memory, the computer system further comprises:
   a test case importing module configured to receive, using the microprocessor, one or more test cases;
   a Natural Language Processing (NLP) module configured to scan and mine, using the microprocessor, text of the one or more received test cases;
   a user interface object identifier configured to identify, using the microprocessor, one or more User Interface (UI) elements, one or more functional flow models and one or more test steps and corresponding test data based on the mined text of the one or more test cases;
   a risk engine configured to identify, using the microprocessor, risks associated with the one or more applications from historical data associated with the one or more applications and process the identified risks using artificial intelligence techniques;
   a user interface object mapper configured to map, using the microprocessor, the one or more identified UI elements from the one or more test cases with one or more user interface elements corresponding to one or more wireframes, wherein the one or more wireframes are received and scanned by the NLP module and the one or more user interface elements in the one or more scanned wireframes are identified by the user interface object identifier;
   a test script generator configured to receive the mapped one or more UI elements, the one or more identified functional flow models and the identified one or more test steps and corresponding test data for generating, using the microprocessor, one or more test scripts corresponding to the one or more received test cases; and
   a reporting engine configured to generate, using the microprocessor, one or more reports, wherein the one or more reports comprise details of the one or more applications under test, and associated validation and test execution results.

2. The computer system of claim 1, wherein the one or more test cases are received from one or more sources comprising one or more test management systems, one or more test design tools and one or more test case repositories.

3. The computer system of claim 1, wherein the one or more test cases are received by importing, using the microprocessor, one or more files and further wherein the one or more files have one or more formats comprising spreadsheet format, document format, Extensible Markup Language (XML) format and image format.

4. The computer system of claim 1, wherein scanning and mining the text of the one or more received test cases comprises understanding words, sentences and their relationships with respect to context, tagging the mined text of the one or more received test cases, identifying relationships and deciphering functional flow between the tagged content, identifying context of the one or more mined test cases and using machine learning features.

5. The computer system of claim 1, wherein the one or more functional flow models provide, using the microprocessor, logical relationship between the one or more test cases and the one or more test steps.

6. The computer system of claim 1, wherein the test script generator is configured to structure and forward, using the microprocessor, the mapped one or more UI elements, the one or more identified functional flow models and the identified one or more test steps and corresponding test data to one or more external test automation tools.

7. The computer system of claim 1, wherein the one or more wireframes pertain to one or more software applications under development.

8. The computer system of claim 1 further comprising an artificial intelligence module configured to perform functions comprising analytical reasoning, updating knowledge bank, planning, learning through actions, initiating natural language processing, perception and manipulation.

9. A computer-implemented method for generating software testing scripts from test cases associated with one or more applications, via program instructions stored in a memory and executed by a processor, the computer-implemented method comprising:
   receiving one or more test cases;
   scanning and mining text of the one or more received test cases;

identifying one or more User Interface (UI) elements, one or more functional flow models and one or more test steps and corresponding test data based on the mined text of the one or more test cases;

identifying risks, associated with the one or more applications, from historical data associated with one or more applications and process the identified risks using artificial intelligence techniques;

mapping the one or more identified UI elements from the one or more test cases with one or more UI elements corresponding to one or more wireframes, wherein the one or more wireframes are received and scanned and the one or more user interface elements in the one or more scanned wireframes are then identified;

receiving, at a test script generator, the mapped one or more UI elements, identified one or more functional flow models and the identified one or more test steps and corresponding test data for generating one or more test scripts corresponding to the one or more received test cases; and generating one or more reports, wherein the one or more reports comprise details of the one or more applications under test, and associated validation and test execution results.

10. The computer-implemented method of claim 9, wherein the one or more test cases are received from one or more sources comprising one or more test management systems, one or more test design tools and one or more test case repositories.

11. The computer-implemented method of claim 9, wherein the one or more test cases are received by importing one or more files and further wherein the one or more files have one or more formats comprising spreadsheet format, document format, Extensible Markup Language (XML) format and image format.

12. The computer-implemented method of claim 9, wherein scanning and mining the text of the one or more received test cases comprises understanding words, sentences and their relationships with respect to context, tagging the mined text of the one or more received test cases, identifying relationships and deciphering functional flow between the tagged content, identifying context of the one or more mined test cases and using machine learning features.

13. The computer-implemented method of claim 9, wherein the one or more functional flow models provide logical relationship between the one or more test cases and the one or more test steps.

14. The computer-implemented method of claim 9, wherein the test script generator is configured to structure and forward the mapped one or more UI elements, the identified one or more functional flow models and the identified one or more test steps and corresponding test data to one or more external test automation tools.

15. The computer-implemented method of claim 9, wherein the one or more wireframes pertain to one or more software applications under development.

16. A computer program product for generating software testing scripts from test cases associated with one or more applications, the computer program product comprising:

a non-transitory computer-readable medium having computer-readable program code stored thereon, the computer-readable program code comprising instructions that when executed by a processor, cause the processor to:

receive one or more test cases;

scan and mine text of the one or more received test cases;

identify one or more User Interface (UI) elements, one or more functional flow models and one or more test steps and corresponding test data based on the mined text of the one or more test cases;

identify risks, associated with the one or more applications, from historical data associated with one or more applications and process the identified risks using artificial intelligence techniques;

map the one or more identified UI elements from the one or more test cases with one or more UI elements corresponding to one or more wireframes, wherein the one or more wireframes are received and scanned and the one or more user interface elements in the one or more scanned wireframes are then identified;

receive, at a test script generator, the mapped one or more UI elements, identified one or more functional flow models and the identified one or more test steps and corresponding test data for generating one or more test scripts corresponding to the one or more received test cases; and generate one or more reports, wherein the one or more reports comprise details of the one or more applications under test, and associated validation and test execution results.

\* \* \* \* \*